W. H. PERRINE.
INNER TUBE STRIPPING POST.
APPLICATION FILED FEB. 14, 1922.
1,419,752.
Patented June 13, 1922.
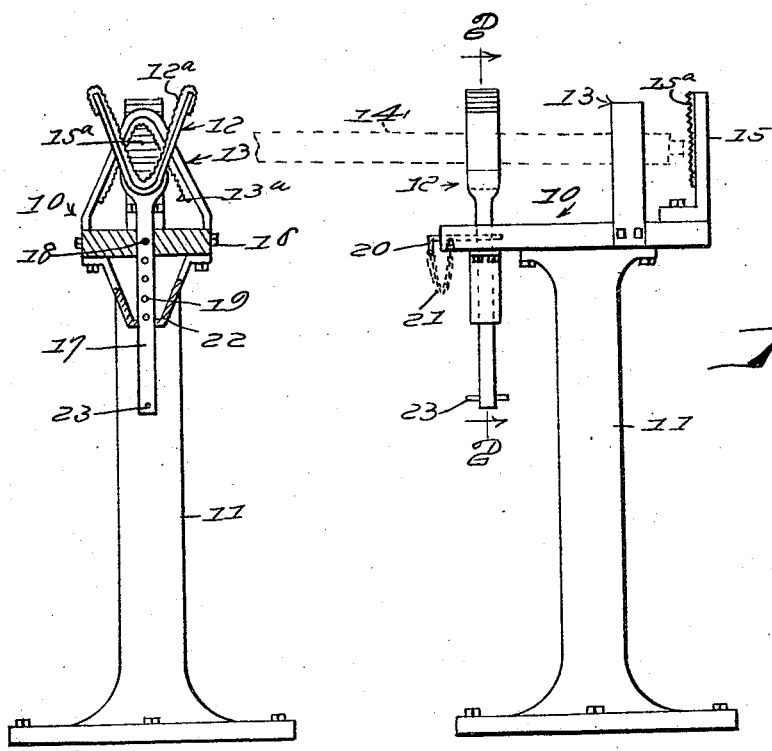
Fig.1.
Fig.2.
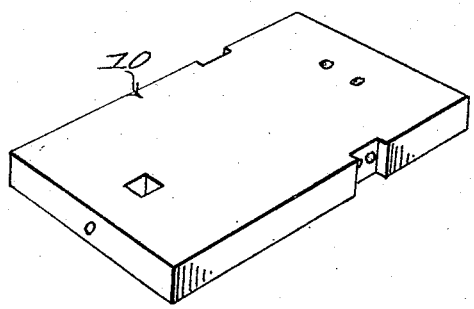
Fig.3.
Inventor
Wilbur H. Perrine,
By
Attorney

UNITED STATES PATENT OFFICE.

WILBUR H. PERRINE, OF TRENTON, NEW JERSEY.

INNER-TUBE-STRIPPING POST.

1,419,752.    Specification of Letters Patent.    Patented June 13, 1922.

Application filed February 14, 1922. Serial No. 536,447.

*To all whom it may concern:*

Be it known that I, WILBUR H. PERRINE, a citizen of the United States of America, residing at Trenton, in the county of Mercer and State of New Jersey, have invented new and useful Improvements in Inner-Tube-Stripping Posts, of which the following is a specification.

The object of the invention is to provide a simple and efficient means for use in connection with the stripping of rubber tubes, in the course of construction of inner tubes for pneumatic tires, from the core bars upon which they are formed and subsequent to the vulcanization thereof; and particularly to provide a device for this purpose by which the bar can be efficiently held during the stripping operation without injuring or marring the bar, and under conditions adapting the holder to different diameters of core bars; and with this object in view the invention consists in a construction and combination of parts of which a preferred embodiment is shown in the accompanying drawings, wherein:—

Figure 1 is a side view of an apparatus embodying the invention.

Figure 2 is a vertical sectional view of the same on the plane indicated by the line 2—2 of Figure 1.

Figure 3 is a detail view in perspective of the table.

The device consists essentially of a table 10 suitably supported by a post or pedestal 11 to the end that it may be held in a rigid position, and reversely disposed upwardly and downwardly opening V-shaped jaws 12 and 13 supported by the table in spaced relation to the end that a core bar 14 such as is used in the present practice of forming tubes for pneumatic tires may be seated and held by a downward pressure upon the seat furnished by the forward jaw 12 and upward pressure upon the seat furnished by the rear jaw 13 as clearly indicated in Figure 1.

A backing stop 15 is preferably arranged at the rear end of the table in the path of longitudinal movement of a bar through the jaws, to limit such movement and provide for holding the bar against longitudinal displacement during the operation of stripping the tube therefrom, the stripping operation comprising the turning back of the end of the tube adjacent the forward jaw 12 and thereafter forcing air in under the tube so that it may be readily withdrawn from the core bar.

The inner surfaces of the oppositely directed jaws are provided with yielding facings 12ª and 13ª, and the surface of the backing stop is similarly provided with a facing 15ª, all of which may be of rubber and which in addition as shown may be serrated or corrugated to afford a relatively roughened but yielding surface adapted to have a frictional engagement with the bar or the tube on the bar prior to the displacement thereof.

The rear jaw 13 which is arranged to face downwardly has its side members extended and secured for example by means of bolts 16 to the side edges of the table 10 and the front jaw is preferably adjustable relative to the rear jaw to adapt the apparatus to different dimensions of core bars, and to this end said front jaw is provided with a shank 17 extending through a guide opening 18 in the table provided with a series of openings 19 for selective engagement by a pin 20 which in the construction illustrated is shown connected with the table to avoid displacement by means of a chain 21. Also a depending guide bracket 22 is provided on the table to receive the lower projecting end of the shank 17 and thereby brace the latter against lateral deflection or displacement. A stop pin 23 may be arranged in the lower end of the shank to prevent the dismounting of the adjustable jaw by engaging the lower end of the guide bracket.

It will be obvious that a core bar with the tube formed thereon may be arranged in the apparatus and clamped by its own weight or by a slight pressure upon the free front end thereof so that it may be held from longitudinal movement during the stripping of the tube, without the adjustment of any particular or specific clamping means and therefore without any loss of time, so that the operation of the workmen in stripping the tubes is materially facilitated and the work expedited.

Having described the invention, what is claimed as new and useful is:—

1. An apparatus for holding core bars during the stripping of tubes therefrom, having spaced oppositely facing substantially V-shaped jaws forming seats for the bar.

2. An apparatus for holding core bars during the stripping of tubes therefrom, having spaced oppositely facing substantially V-shaped jaws forming seats for the bar, a backing stop being arranged in the path of longitudinal movement of a core bar through said jaws.

3. An apparatus for holding core bars during the stripping of tubes therefrom, having spaced oppositely facing substantially V-shaped jaws forming seats for the bar, said jaws being provided with yielding facing cushions.

4. An apparatus for holding core bars during the stripping of tubes therefrom, having spaced oppositely facing substantially V-shaped jaws forming seats for the bar, one of said jaws being adjustable with relation to the other in the direction of a bi-sector of its angle.

5. An apparatus for holding core bars during the stripping of tubes therefrom, having spaced oppositely facing substantially V-shaped jaws forming seats for the bar, a suitably supported table being employed to sustain said jaws, and one of the jaws having a shank adjustably mounted upon the table to vary the transverse distance between the angles of the jaws.

6. An apparatus for the purpose described having a table, oppositely directed V-shaped front and rear jaws carried by the table, one of said jaws having its arms secured to the table and the other being provided with a shank adjustably fitted in a guide opening in the table, means for securing said shank in its adjusted positions, and a back stop arranged in the path of longitudinal movement of a core bar seated in said jaws.

In testimony whereof I affix my signature.

WILBUR H. PERRINE.